United States Patent
Wilkins (10) Patent No.: US 10,752,378 B2
(45) Date of Patent: Aug. 25, 2020

(54) MOBILE APPARATUS FOR PEST DETECTION AND ENGAGEMENT

(71) Applicant: The Boeing Company, Chicago, IL (US)

(72) Inventor: Donald F. Wilkins, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 889 days.

(21) Appl. No.: 14/576,041

(22) Filed: Dec. 18, 2014

(65) Prior Publication Data
US 2016/0176542 A1 Jun. 23, 2016

(51) Int. Cl.
| | |
|---|---|
| G06T 1/00 | (2006.01) |
| B64D 47/08 | (2006.01) |
| H04N 5/225 | (2006.01) |
| A01M 27/00 | (2006.01) |
| A01M 31/00 | (2006.01) |
| G06T 3/40 | (2006.01) |
| B64C 39/02 | (2006.01) |
| H04N 5/232 | (2006.01) |

(52) U.S. Cl.
CPC ............ B64D 47/08 (2013.01); A01M 27/00 (2013.01); A01M 31/002 (2013.01); B64C 39/024 (2013.01); G06T 1/0007 (2013.01); G06T 3/4053 (2013.01); H04N 5/2251 (2013.01); H04N 5/2252 (2013.01); H04N 5/23232 (2013.01); B64C 2201/108 (2013.01); B64C 2201/127 (2013.01); G06T 2207/10032 (2013.01)

(58) Field of Classification Search
CPC ..... A01M 27/00; A01M 31/002; B64D 47/08; G06T 1/0007; G06T 2207/10032; G06T 3/4053; H04N 5/2251; H04N 5/2252; H04N 5/23232

USPC .......................................................... 348/144
See application file for complete search history.

(56) References Cited

U.S. PATENT DOCUMENTS

| | | | | |
|---|---|---|---|---|
| 7,501,979 | B1 * | 3/2009 | Guice ................... | A01M 1/026 235/400 |
| 2005/0051667 | A1 * | 3/2005 | Arlton ..................... | B64C 27/10 244/17.11 |
| 2006/0069460 | A1 * | 3/2006 | Smith .............. | G01R 31/31717 700/110 |
| 2006/0271251 | A1 * | 11/2006 | Hopkins ................. | A63H 30/04 701/23 |

(Continued)

OTHER PUBLICATIONS

TechEBlog website for Insect-Sized Spy Drone Robots Unveiled . . . http://techeblog.com/index.php/techgadget/insect-sized-spy-drone-robots-unveiled.*

(Continued)

Primary Examiner — James T Boylan
(74) Attorney, Agent, or Firm — Kunzler Bean & Adamson (57) ABSTRACT

Described herein is a mobile apparatus for capturing images that includes a body, a propulsion device coupled to the body and actuatable to propel the body in response to a motion control command. The mobile apparatus also includes a low-resolution camera coupled to the body and configured to capture a plurality of low-resolution images. Further, the mobile apparatus includes a transceiver coupled to the body. The transceiver is configured to wirelessly receive the motion control command and wirelessly transmit the plurality of low-resolution images.

20 Claims, 5 Drawing Sheets

(56) References Cited

U.S. PATENT DOCUMENTS

| | | | | |
|---|---|---|---|---|
| 2007/0244608 | A1* | 10/2007 | Rath | G05D 1/0038 701/3 |
| 2009/0107222 | A1* | 4/2009 | Abramovitch | B82Y 35/00 73/105 |
| 2010/0268409 | A1* | 10/2010 | Vian | G05D 1/104 701/24 |
| 2012/0050524 | A1* | 3/2012 | Rinner | G06T 7/33 348/117 |
| 2012/0210853 | A1* | 8/2012 | Abershitz | B64F 1/04 89/1.11 |
| 2012/0320203 | A1* | 12/2012 | Liu | G01C 11/04 348/144 |
| 2013/0156271 | A1* | 6/2013 | Cimino | G06K 9/00624 382/110 |
| 2013/0172674 | A1* | 7/2013 | Kennedy, II | A61B 1/018 600/109 |
| 2013/0200207 | A1* | 8/2013 | Pongratz | B64C 37/02 244/2 |
| 2013/0345876 | A1* | 12/2013 | Rudakevych | B25J 9/1697 700/259 |
| 2014/0168434 | A1* | 6/2014 | Gerlach | H04N 7/183 348/144 |
| 2014/0168482 | A1* | 6/2014 | Herman | G06T 5/001 348/241 |
| 2015/0042834 | A1* | 2/2015 | Miao | H04N 5/2257 348/218.1 |
| 2015/0160658 | A1* | 6/2015 | Reedman | G05D 1/102 701/3 |
| 2015/0163849 | A1* | 6/2015 | Bauer | G01D 4/006 702/62 |
| 2016/0006954 | A1* | 1/2016 | Robertson | H04N 5/332 348/144 |
| 2016/0039541 | A1* | 2/2016 | Beardsley | B60L 11/1816 701/2 |
| 2016/0156230 | A1* | 6/2016 | Khan | H01Q 1/32 307/104 |
| 2016/0306356 | A1* | 10/2016 | Tebay | G05D 1/0094 |

OTHER PUBLICATIONS

Internet Wayback machine archive showing date of Aug. 20, 2014 for subject matter being relied upon in the techeblog website.*

Simon Crisp "Camera sensor size: Why does it matter and exactly how big are they", https://newatlas.com/camera-sensor-size-guide/26684/.*

Date pulled from Google for the Simon Crisp date of Mar. 21, 2013.*

John W. Whitehead, "Roaches, Mosquitoes and Birds: The Coming Micro-Drone Revolution", Apr. 17, 2013 (Year: 2013).*

Kuchment, The End of Orange Juice: A devastating disease is killing citrus trees from Florida to California, Scientific American, Mar. 2013, pp. 52-59.

http://io9.com/dont-get-paranoid-but-there-are-now-insect-sized-flyi-487336929 accessed Mar. 16, 2015.

Ma et al., Controlled Flight of a Biologically Inspired, Insect-Scale Robot, Science, May 3, 2013, pp. 603-607, vol. 340.

snopes.com, Inspect Spy Drone, accessed Mar. 16, 2015.

http://link.brightcove.com/services/player/bcpid1399191810?bctid=2165962192001, link for open loop video, accessed Mar. 16, 2015.

http://bcove.me/hi7e0n72, link for robo-bee video, accessed Mar. 16, 2015.

Gill, Robotic Insect: World's smallest flying robot takes off (Drone/UAV). freerepublic.com, May 2, 2013.

* cited by examiner

MOBILE APPARATUS FOR PEST DETECTION AND ENGAGEMENT

FIELD

This disclosure relates generally to capturing images, and more particularly to capturing images using a mobile apparatus.

BACKGROUND

Devices and techniques for capturing images are widely known in the art. However, some conventional devices and techniques are inadequate for capturing images of certain objects and environments. For example, certain conventional devices and techniques may be incapable of capturing images of objects in dangerous, small-scale, and/or difficult-to-reach locations. Additionally, conventional image capturing devices and techniques do not incorporate means for achieving secondary objectives associated with captured images.

SUMMARY

The subject matter of the present application has been developed in response to the present state of the art, and in particular, in response to the problems associated with capturing images that have not yet been fully solved by currently available techniques. The subject matter of the present application has been developed to provide apparatuses, systems, and methods for capturing images that overcome at least some of the above-discussed shortcomings of prior art techniques.

According to one embodiment, a system for capturing images includes a mobile apparatus movable along a path proximate an object. The mobile apparatus includes a low-resolution camera to capture a plurality of low-resolution images of the object along the path. Additionally, the mobile apparatus includes a second transceiver to wirelessly transmit the plurality of low-resolution images. The system further includes a controller proximate the object and physically separate from the mobile apparatus. The controller includes a first transceiver to wirelessly receive the plurality of low-resolution images from the second transceiver, and an image module to aggregate the plurality of low-resolution images into a composite image.

In some implementations of the system, the controller further includes a motion control module to generate motion control commands. The first transceiver wirelessly transmits the motion control commands, and the second transceiver wirelessly receives the motion control commands from the first transceiver. The mobile apparatus further includes a propulsion device to provide lift and directional flight for the mobile apparatus in response to the motion control commands.

According to certain implementations of the system, the controller further includes a power transmitter to wirelessly transmit electrical power to the mobile apparatus. The mobile apparatus may further include a power receiver to wirelessly receive electrical power from the controller.

In some implementations of the system, the plurality of low-resolution images are wirelessly transmitted from the mobile apparatus to the controller, the motion control module controls movement of the mobile apparatus via motion control commands wirelessly transmitted from the controller to the mobile apparatus, and the weapon control module controls deployment of the weapon via weapon deployment commands wirelessly transmitted from the controller to the mobile apparatus. The controller can further include a power transmitter to wirelessly transmit electrical power to the mobile apparatus. According to some implementations, the controller includes a first antenna and a second antenna, and the mobile apparatus includes a third antenna and a fourth antenna. The power transmitter wirelessly transmits electrical power from the first antenna of the controller to the third antenna of the mobile apparatus, the plurality of low-resolution images are wirelessly transmitted from the fourth antenna of the mobile apparatus to the second antenna of the controller, the motion control commands are wirelessly transmitted from the second antenna of the controller to the fourth antenna of the mobile apparatus, and the weapon deployment commands are wirelessly transmitted from the second antenna of the controller to the fourth antenna of the mobile apparatus.

According to certain implementations of the system, the mobile apparatus includes a position communication device to transmit signals. The controller includes a position module to determine a position of the mobile apparatus based on the signals transmitted from the position communication device. The position communication device can include a light emitter, and the position module can include a sensor array that detects light emitted from the light emitter. The position module may determine the position of the mobile apparatus based on light detected by the sensor array.

In some implementations of the system, the path has a shape that includes a plurality of waves. The composite image includes a plurality of columns and rows each comprising a plurality of low-resolution images of the object. Each wave of the shape of the path corresponds with two adjacent columns of the plurality of columns of the composite image or two adjacent rows of the plurality of rows of the composite image. According to one implementation, a spatial frequency of the plurality of waves of the path is indirectly proportional to a pixel count of each low-resolution image of the plurality of low-resolution images.

According to an implementation of the system, the path includes a plurality of passes along a portion of the object. The composite image is of the portion of the object. The quantity of passes of the plurality of passes of the path is dependent on a pixel count of the low-resolution camera.

In certain implementations of the system, the mobile apparatus includes a first health module to generate health status data. The second transceiver wirelessly transmits the health status data, and the first transceiver wirelessly receives the health status data from the second transceiver. The controller includes a second health module to receive and analyze the health status data received wirelessly from the mobile apparatus.

According to some implementations of the system, the mobile apparatus includes an unmanned aerial vehicle. The path is a flight path above a ground level. The controller is located on the ground level.

In certain implementations of the system, the object is a pest-inhabited object. The mobile apparatus includes a weapon deployable to at least agitate a pest on the pest-inhabited object. The image module locates a pest on the pest-inhabited object using the composite image. The controller further includes a motion control module to control movement of the mobile apparatus into a weapon-deployment location via motion control commands wirelessly transmitted from the first transceiver and wirelessly received by the second transceiver. The weapon-deployment location is based on the location of the pest. Additionally, the controller includes a weapon control module to control deployment of the weapon via weapon deployment commands wirelessly transmitted from the first transceiver and wirelessly received by the weapon via the second transceiver. In some implementations of the system, a size of the mobile apparatus is between 50% and 200% of a size of the pest.

In another embodiment, a mobile apparatus for capturing images includes a body, a propulsion device coupled to the body and actuatable to propel the body in response to a motion control command. The mobile apparatus also includes a low-resolution camera coupled to the body and configured to capture a plurality of low-resolution images. Further, the mobile apparatus includes a transceiver coupled to the body. The transceiver is configured to wirelessly receive the motion control command and wirelessly transmit the plurality of low-resolution images.

In some implementations, the mobile apparatus is microsized. The propulsion device can provide lift and directional flight for the body. The low-resolution camera can be a single-pixel camera.

According to one implementation, the mobile apparatus further includes an electrical power receiver coupled to the body. The electrical power receiver wirelessly receives electrical power for powering the propulsion device and low-resolution camera.

According to certain implementations, the mobile apparatus includes at least one antenna coupled to the body. The at least one antenna is configured to wirelessly receive electrical power, wirelessly receive data communications, and wirelessly transmit data communications.

In some implementations, the mobile apparatus further includes a weapon coupled to the body, the weapon being deployable against a target based on weapon deployment commands received wirelessly by the transceiver. In one implementation, the mobile apparatus consists of the body, the low-resolution camera, the weapon, the propulsion device, and the at least one antenna. In one implementation, the weapon includes a poison and a poison deployment mechanism. According to one implementation of the mobile apparatus, the weapon includes a pointed object deployable to contact the pest. In some implementations of the mobile apparatus, the weapon is deployable to kill the pest. The weapon may include at least one of a poison-based weapon and a blunt-force-based weapon. In an implementation, the weapon comprises a poison source and the poison-based weapon comprises a conduit for fluidly communicating poison from the poison source.

According to another embodiment, a method for capturing images includes moving a mobile apparatus along a scanning path adjacent an object. The method also includes capturing low-resolution images of the object along the scanning path, and aggregating the low-resolution images into a composite image based on the scanning path. Additionally, the method includes locating a target on the object using the composite image, and moving the mobile apparatus to the location of the target. With the mobile apparatus at the location of the target, the method includes deploying an objective device on-board the apparatus against the target. Each of the low-resolution images can be a single-pixel image.

In some implementations, the method further includes wirelessly supplying electrical power to the mobile apparatus.

According to certain implementations, the method also includes, after deploying the objective device, moving the mobile apparatus along a second scanning path adjacent the object, capturing second low-resolution images of the object along the second scanning path, and aggregating the second low-resolution images into a second composite image. The method may further include comparing the composite image with the second composite image, and determining a status of the target based on the comparison between the composite image and the second composite image.

According to another embodiment, a method for controlling pests on a pest-inhabited object includes moving a mobile apparatus along a path adjacent a pest-inhabited object. The method further includes capturing low-resolution images of the pest-inhabited object along the path, and aggregating the low-resolution images into a composite image at a location remote from the mobile apparatus. Each of the low-resolution images can be a single-pixel image. Additionally, the method includes locating a pest on the pest-inhabited object using the composite image at the location remote from the mobile apparatus. The method also includes moving the mobile apparatus into a weapon-deployment location corresponding with the location of the pest, and, with the mobile apparatus in the weapon-deployment location, deploying a weapon on-board the apparatus to at least agitate the pest.

In another embodiment, a mobile apparatus for controlling pests includes a body and a low-resolution camera coupled to the body. The mobile apparatus also includes a weapon coupled to the body and deployable to at least agitate a pest based on a plurality of low-resolution images captured by the low-resolution camera. Further, the mobile apparatus includes a propulsion device coupled to the body and actuatable to move the mobile apparatus relative to the pest. The mobile apparatus can be micro-sized. Further, the low-resolution camera can be a single-pixel camera.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
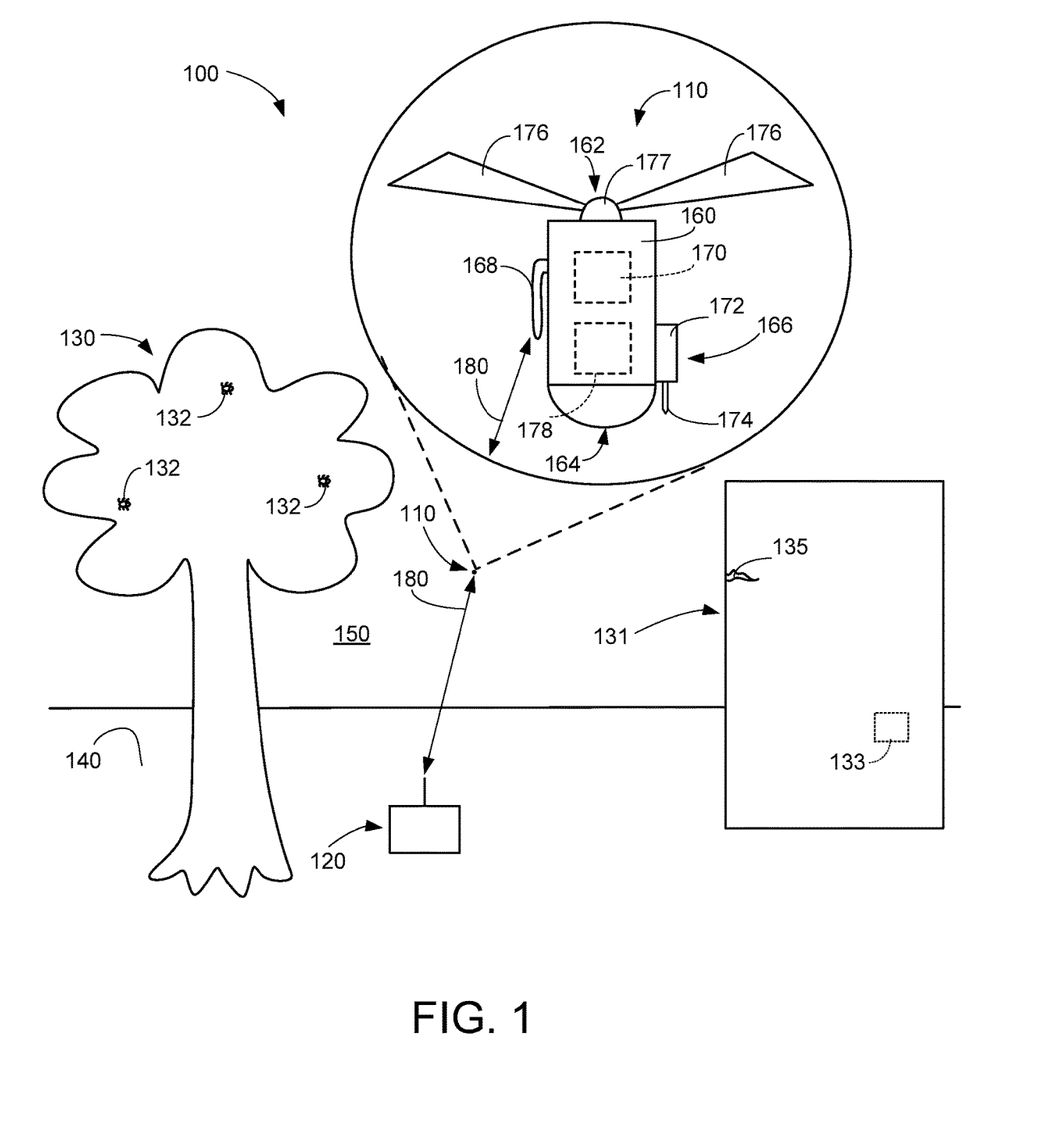
FIG. 1 is a schematic block diagram of a system for controlling pests according to one embodiment.

Referring to FIG. 1, according to one embodiment, a system 100 for capturing images includes a mobile apparatus 110 and a controller 120. Generally, the controller 120 wirelessly powers, controls, and communicates with the mobile apparatus 110 to capture images of an object. In one embodiment, the system 100 captures images and utilizes captures images to locate targets on an object, such as pests 132 on a pest-inhabited object 130. According to another embodiment, the system 100 captures images of a target 133 associated with an object 131, and may perform a secondary operation or objective associated with the target, such as eradicating located pests 132, in certain implementations.

A pest-inhabited object 130 is defined as any object on which at least one pest is located. Typically, pests 132 are located on biological objects, such as plants (e.g., trees, shrubs, bushes, grasses, and the like), as they feed on the biological objects. As defined herein, pests 132 are destructive insects, such as beetles, borers, caterpillars, mites, psyllids, or other animals, such as raccoons, foxes, mice, and the like, that attack or feed on objects. Pest-inhabited objects 130 can be located above the ground 140. For example, like the tree represented in FIG. 1, biological objects can grow upward from the ground into the air 150 above the ground.

Conventional techniques for controlling pests include preventative measures for keeping pests from infesting an object, and eradicating measures that rid a pest-inhabited object of pests. Some eradicating measures include large-scale spraying of pesticides on pest-inhabited objects. Such eradication efforts concentrate on large-scale targets, such as the entire pest-inhabited object or a grouping of pest-inhabited objects. Some shortcomings associated with large-scale spraying of pesticides include high costs for supplying excessive quantities of pesticide necessary to cover entire objects, a relatively low pest kill-rate or agitation-rate, and negative environmental consequences.

The mobile apparatus 110 includes a body 160. Coupled to, or on-board, the body 160 is a propulsion device 162 and a low-resolution camera 164. In some implementations, also coupled to the body 160 is an objective device 165 used to accomplish a secondary objective. The objective device 165 can be a weapon 166 and/or a repair tool 167. In some implementations, such as for pest control applications, the objective device 165 is a weapon 166. Generally, in such implementations, the propulsion device 162 propels or moves the mobile apparatus 110 relative to a pest 132 located on the pest-inhabited object 130, the low-resolution camera 164 captures a sequence of low-resolution images of the pest-inhabited object 130 that are aggregated into a composite image to locate the pest 132, and the weapon 166 at least agitates (e.g., kills) the pest 132 to cause the pest to vacate the pest-inhabited object.

The propulsion device 162 can be any of various devices for propelling the mobile apparatus 110. In the illustrated embodiment, the propulsion device 162 includes two or more wings 176 that reciprocate (e.g. flap) relative to the body 160 to provide lift and directional flight for the body. For example, the wings 176 may reciprocate in a manner consistent with the flapping of the wings of a bird or flying insect. The rate of reciprocation of the wings 176 can be adjusted to provide more or less lift for the body 160. Additionally, the rate of reciprocation of the wings 176 relative to each other can be adjusted to propel the body 160 from side to side. Moreover, the angle of the wings 176 relative to the body 160 may be adjustable to propel the body 160 forward and backward. The propulsion device 162 also includes an actuator 177 that actuates (e.g., reciprocates) the wings 176, as well as articulates or tilts the wings. The actuator 177 includes one or more electric motors or drivers in some implementations. In certain implementations, the propulsion device 162 includes a rotor, or propeller, with two or more blades driven and articulated by one or more electric motors.

The low-resolution camera 164 can be any of various digital cameras for capturing low-resolution images of the pest-inhabited object 130. Generally, the low-resolution camera 164 includes a lens, shutter, aperture, and image sensor. Light enters the low-resolution camera 164 through the lens. The shutter opens and closes to allow light to reach the image sensor after passing through the lens. The aperture controls the amount of light reaching the image sensor. In some implementations, the aperture has a fixed dimension. The image sensor receives light as an optical image, and coverts the optical image to an electronic signal. The image sensor is an active-pixel image sensor, such as a complementary metal-oxide semiconductor (CMOS) and charge-coupled device (CCD) sensor. The active-pixel image sensor includes an integrated circuit with at least one pixel sensor, which has a photo-detector and an amplifier in some implementations. Each pixel sensor captures a single pixel of an optical image. A pixel is the smallest controllable element of a digitized optical image.

The quantity of pixel sensors of the active-pixel image sensor defines the resolution of the camera. Generally, the lower the quantity of pixel sensors, the lower the resolution of the camera, and the higher the quantity of pixel sensors, the higher the resolution of the camera. In the illustrated embodiment, the camera is a low-resolution camera 164 because it has a lower quantity of pixel sensors that capture a low-resolution image, or an image defined by a lower quantity of pixels. In some implementations, the low-resolution camera 164 has less than about 200 pixel sensors to capture low-resolution images each with less than about 200 pixels. According to certain implementations, the low-resolution camera 164 has less than about 50 pixel sensors to capture low-resolution images each with less than about 50 pixels. In a particular implementation, the low-resolution camera 164 has a single pixel sensor to capture low-resolution images each with a single pixel. As will be explained in more detail below, the characteristics of a designated path that the mobile apparatus is controlled to follow corresponds with the resolution (e.g., the quantity of pixel sensors) of the low-resolution camera 164.

The weapon 166 can be any of various weapons configured to at least agitate the pest 132 to cause the pest to vacate the pest-inhabited object. According to some implementations, the weapon 166 can be poison-based or blunt-force-based.

A weapon 166 that is poison-based includes an actuator 172, in the form of a poison deployment mechanism, an instrument 174, and a poison source 178. The poison deployment mechanism is fluidly coupled to the poison source 178 and configured to deploy poison received from the poison source. The poison can be any of various poisons, such as repellants, toxins, and venom, formulated to agitate, sicken, or kill a pest 132. The poison source 178 can be a reservoir that holds a quantity of poison. In one implementation, the poison source 178 includes a sensor that detects either a quantity of poison remaining in the reservoir or a quantity of poison deployed from the reservoir.

The instrument 174 can be a stinger, such as a needle, pin, or nail, with a relatively pointed end. The stinger includes a conduit for dispensing poison from the poison source 178, through the stinger, and out of the stinger. Accordingly, the mobile apparatus 110 can be positioned to insert the pointed end of the stinger into a pest 132. Then, with the stinger inserted into the pest 132, poison is dispensed into the pest via the conduit in the stinger. The poison deployment mechanism can be an electric pump to pump poison from the poison source 178 into the conduit of the stinger. Additionally, the actuator 172 may include an actuatable element that extends, projects, or otherwise moves the stinger relative to the body 160 to drive the stinger into the pest 132.

According to another implementation, the instrument 174 can be a sprayer configured to spray poison, such as in the form of a mist, onto the pest 132. In such an implementation, the poison deployment mechanism can be an electric pump to pump poison from the poison source 178 into and out of the sprayer. Because the poison is sprayed onto the pest 132, as opposed to injection into the pest, the instrument 174 need not contact the pest in order to expose the pest to the poison. In some implementations, the sprayer sprays just enough poison for at least irritating only a single pest 132. Further, in one implementation, the sprayer is configured to spray poison onto only the pest 132. In this manner, poison is not sprayed onto areas surrounding the pest 132, such as portions of the pest-inhabited object 130 on which the pest is located.

A weapon 166 that is blunt-force-based also includes an actuator 172 and an instrument 174. However, the instrument 174 of the blunt-force-based weapon 166 is a blunt-force instrument configured to impart a blunt force onto the pest 132. In some implementations, the instrument 174 is a blunt instrument, such as a hammer, with a blunt surface that applies a direct mechanical force onto the pest 132. The actuator 172 of the blunt-force-based weapon 166 can be an actuatable element, such as an electric motor, that swings, projects, extends, or otherwise moves the instrument 174 toward the pest 132 to impact the pest.

The mobile apparatus 110 also includes an antenna 168 coupled to the body 160. The antenna 168 forms part of a power receiver and/or data communications transceiver configured to receive and transmit wireless signals. The wireless signals can transmit electrical power or data communications. In one implementation, the antenna 168 includes a single antenna (e.g., receiving element) that receives both electrical power signals and data communication signals from the controller 120, as well as transmits data communication signals to the controller. According to other implementations, the antenna 168 includes at least two antennas (e.g., two receiving elements) with each antenna (e.g., receiving element) dedicated to receive a respective one of electrical power signals and data communication signals. The antenna dedicated to receive data communication signals may also be dedicated to transmit data communication signals. Alternatively, the antenna 168 may include a third antenna (e.g., transmitting element) dedicated to transmit data communication signals. Accordingly, in some implementations, the antenna 168 may have a single outer structure with multiple receiving and/or transmitting elements therein, or may be multiple structures each with a single receiving and/or transmitting element therein.

Additionally, the mobile apparatus 110 may include a position communication device 170 configured to transmit signals. The signals transmitted by the position communication device 170 can be any of various signals. For example, the position communication device 170 can be a light emitter that generates and emits light, or other similar signals. In one implementation, the position communication device 170 does not generate signals, but operates to reflect signals impinging on the mobile apparatus 110. The position communication device 170 may transmit signals that identify the mobile apparatus 110 from which the signals are originated. In this manner, the system 100 may have multiple mobile apparatuses 110 each with a unique identification that can be communicated to a single or multiple controllers 120 via the position communication device 170. Alternatively, each mobile apparatus 110 may be uniquely identified in another manner.

The mobile apparatus 110 is micro-sized. According to one implementation, micro-sized can be defined as having major dimensions (e.g., height, width, length, and thickness) less than or equal to about 100 mm. Micro-sized may also be defined as being between about 50% and about 200% of a size of a small pest 132, such as an insect. In some implementations, a small pest 132 can be an animal with major dimensions between about 0.25 mm and about 20 mm.

As mentioned, the controller 120 wirelessly powers, controls, and communicates with the mobile apparatus 110. The controller 120 is physically separate from the mobile apparatus 110. In other words, the controller 120 is not physically coupled or attached to the mobile apparatus 110. In this manner, the controller 120 is remote from the mobile apparatus 110. More specifically, although the controller 120 may be positioned in the same general location as the mobile apparatus 110 (e.g., proximate a pest-inhabited object 130), the controller 120 is remote from the mobile apparatus 110 because the controller and mobile apparatus do not share a physical connection.

For flight-based mobile apparatuses 110, during operation, the controller 120 is positioned on the ground 140 near a pest-inhabited object 130, and the mobile apparatus 110 is in flight in the air 150 above the ground. Communication of power and information between the controller 120 and the mobile apparatus 110 is achieved via wireless signals indicated generally by directional arrows 180. In other words, although shown as a single multi-directional line in FIG. 1, the communication of power and information between the controller 120 and the mobile apparatus 110 can be achieved via multiple, separate, and wireless single directional signals as indicated in FIG. 2.

Figure 2:
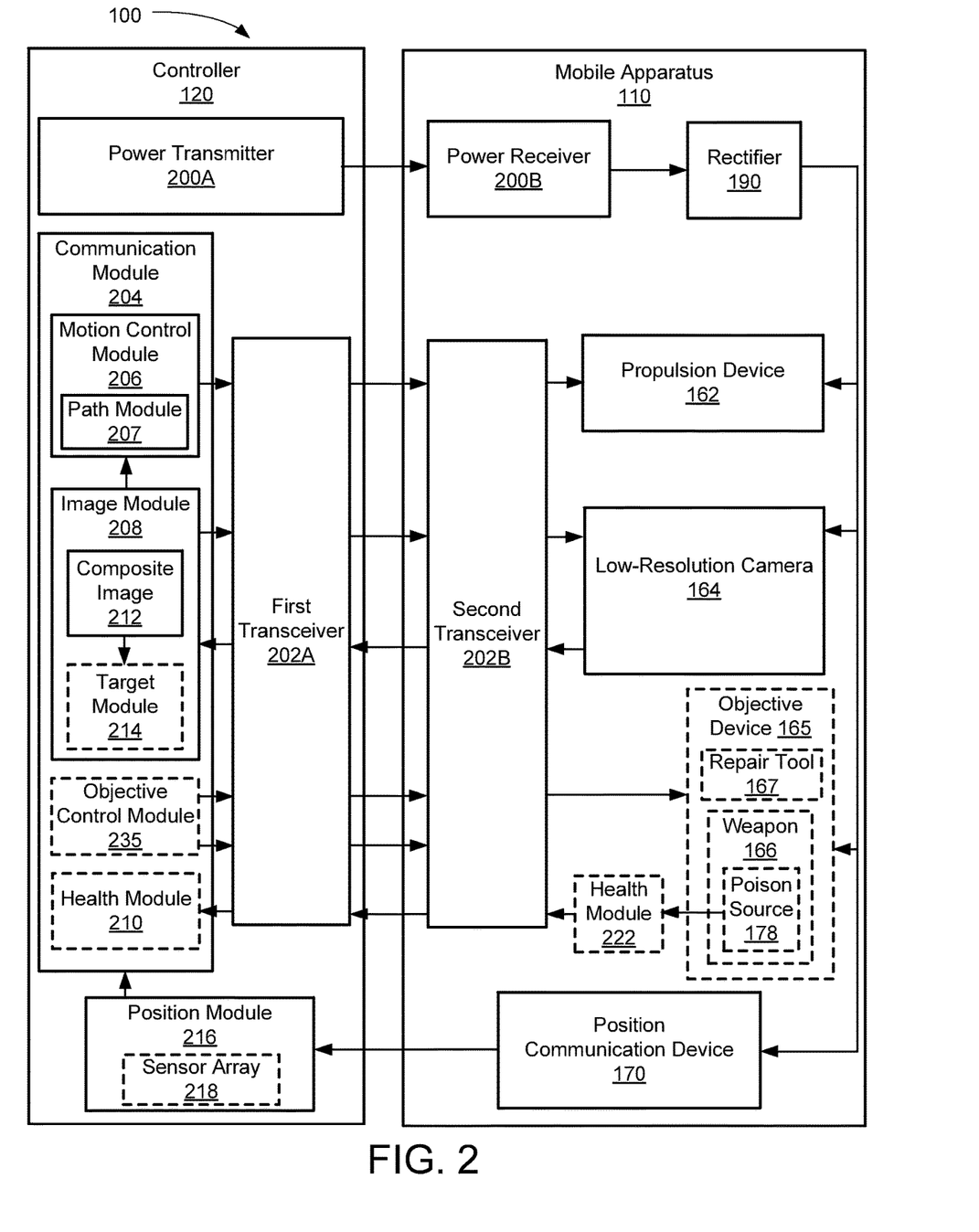
FIG. 2 is a schematic block diagram of a system for controlling pests according to another embodiment.

Referring to FIG. 2, the controller 120 includes a power transmitter 200, a communication module 204, and a position module 216. The power transmitter 200 is configured to generate a power transmission signal, such as an electromagnetic wave (e.g., radio frequency (RF) wave, such as microwaves, radio waves, and millimeter waves), a magnetic field, laser beam, and the like. Generally, the power transmission signal can be any of various signals capable of harnessing energy and being transmitted wirelessly. The power transmission signal is wirelessly transmitted from the power transmitter 200 to the mobile apparatus 110 via a power receiver 200B of the mobile apparatus 110. The power transmitter 200 may include an antenna and the power receiver 200B may include an antenna. The power transmitter 200A is configured to wirelessly transmit power transmission signals. The power transmitter 200A may include a stand-alone antenna with one or more transmitting elements, or an antenna that is integral with an antenna of the first transceiver 202A. In other words, the power transmitter 200A may form part of the first transceiver 202A. The power transmission signal received by the power receiver 200B, or by an antenna of the power receiver, is rectified by a rectifier 190 of the mobile apparatus 110. The power receiver 200B may share an antenna with, or form part of, the second transceiver 202B. In some implementations, the rectifier 190 converts the power transmission signal into a form more useful for the consumption of energy by the components on-board the mobile apparatus 110. For example, the rectifier 190 may convert the power transmission signal from an AC signal to a DC signal. The DC power transmission signal from the rectifier 190 is then provided to the propulsion device 162, low-resolution camera 164, objective device 165, and position communication device 170 on-board the mobile apparatus 110 to power these components.

The communication module 204 of the controller 120 includes a motion control module 206, an image module 208, an objective control module 235, and a health module 210. Generally, the communication module 204 generates data communication signals for wirelessly transferring to the mobile apparatus 110 and receives data communication signals wirelessly transferred from the mobile apparatus. Each of the motion control module 206, image module 208, objective control module 235, and health module 210 generates and/or receives data communication signals associated with the respective function of the module.

The motion control module 206 generates a data communication signal that includes a motion control command. Generally, the motion control command commands the mobile apparatus 110 to move in a particular way and/or to a particular location. In one implementation, the motion control module 206 determines the motion control command based on a designated path 236 of the mobile apparatus 110 (see, e.g., FIG. 4) and the current position of the mobile apparatus determined by the position module 216, as will be explained in more detail below. The designated path 236 is determined by a path module 207 of the motion control module 206. The path module 207 determines the designated path 236 of the mobile apparatus 110 based on a desired portion of the pest-inhabited object 130 to be scanned for pests 132, and the resolution of the low-resolution camera 164. For example, the path module 207 determines the designated area relative to a portion of the pest-inhabited object 130 that should be covered by the designated path 236 of the mobile apparatus 110.

Figure 4:
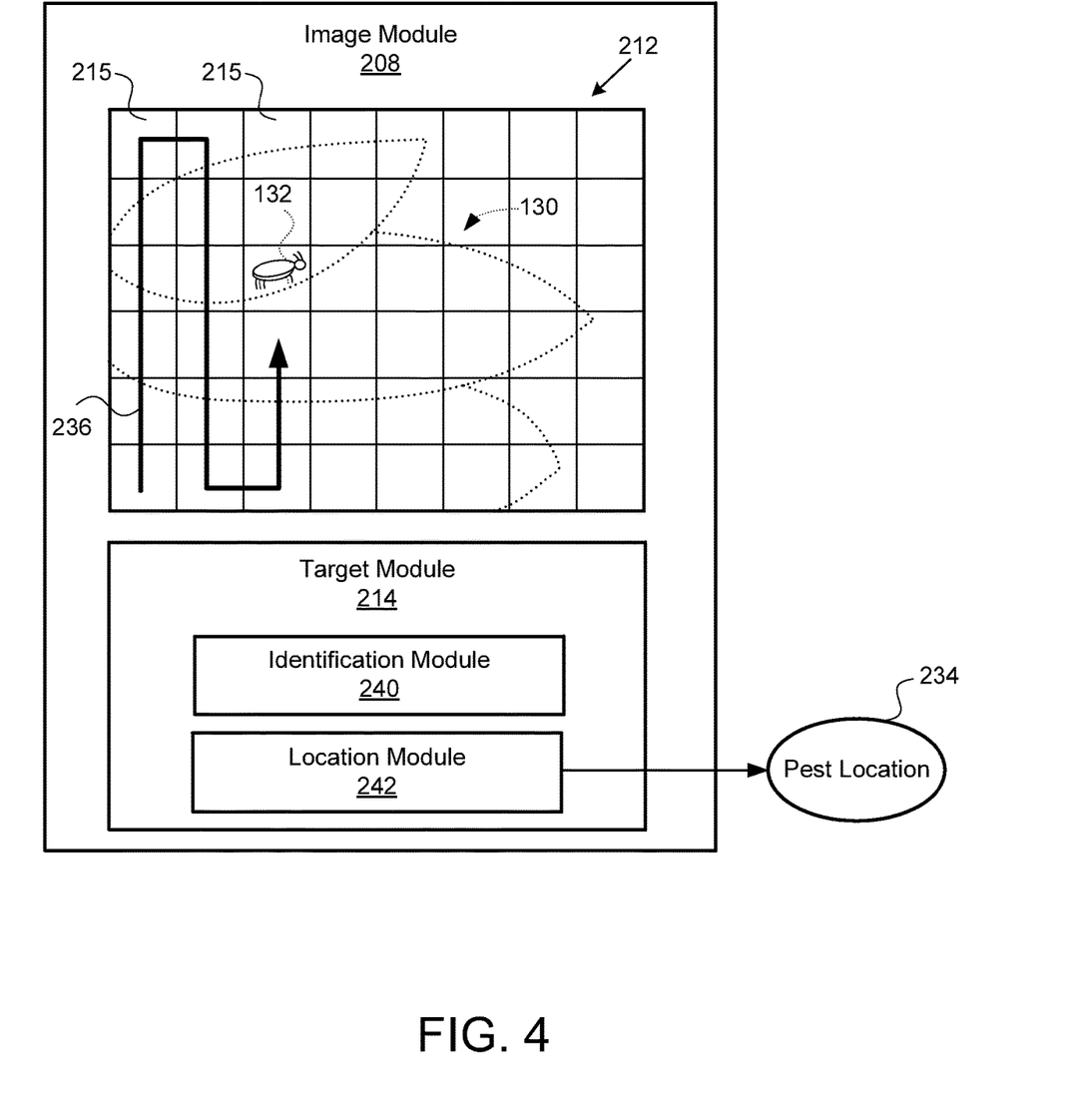
FIG. 4 is a schematic block diagram illustrating an image module of a controller according to one embodiment.

The path module 207 determines a shape of the designated path 236 based at least partially on the resolution or pixel count of the low-resolution camera 164. Generally, the shape of the path 236 (e.g., motion of the mobile apparatus in flight) is used to build a higher resolution composite image. As shown in FIG. 4, the shape of the designated path 236 may be a scanning path that includes a plurality of waves (e.g., a continuous wave) with a spatial frequency that is indirectly proportional to the resolution, or pixel count, of the low-resolution camera 164, and correspondingly, the resolution, or pixel count, of the low-resolution images 215 captured by the low-resolution camera. In other words, as the resolution of the low-resolution camera 164 increases, the spatial frequency of the designated path 236 decreases. Alternatively, or additionally, the path module 207 determines the shape of the designated path 236 or scanning path based on a desired number of passes over the designated area of the portion of the pest-inhabited object 130. The desired number of passes of the designated path 236 can be dependent on the resolution, or pixel count, of the low-resolution camera 164. More specifically, as the resolution of the low-resolution camera 164 decreases, the number of passes of the designated path 236 increases.

The motion control command may include one or more throttle and directional components for moving the mobile apparatus 110 along the designated path 236 over the designated area of the portion of the pest-inhabited object 130. The throttle component is associated with a desired magnitude of the thrust or propulsion of the mobile apparatus, which corresponds with a velocity or altitude of the mobile apparatus. The directional components are associated with a desired direction of movement of the mobile apparatus, such as right and left, or roll, pitch, and yaw. The data communication signals generated by the motion control module 206 are wirelessly transmitted from the motion control module 206 of the communication module 204 to the mobile apparatus 110 via the first transceiver 202A, and associated antenna, and a second transceiver 202B, and associated antenna, of the mobile apparatus 110. In contrast to the power transmitter 200A, which transmits power transmission signals, the first transceiver 202A transmits and receives data communications signals. The propulsion device 162 of the mobile apparatus 110 receives the data communication signal from the communication module 204, the data communication signal including one or more motion control commands, and actuates accordingly to move the mobile apparatus 110 in the commanded manner and/or to the commanded location.

Figure 3:
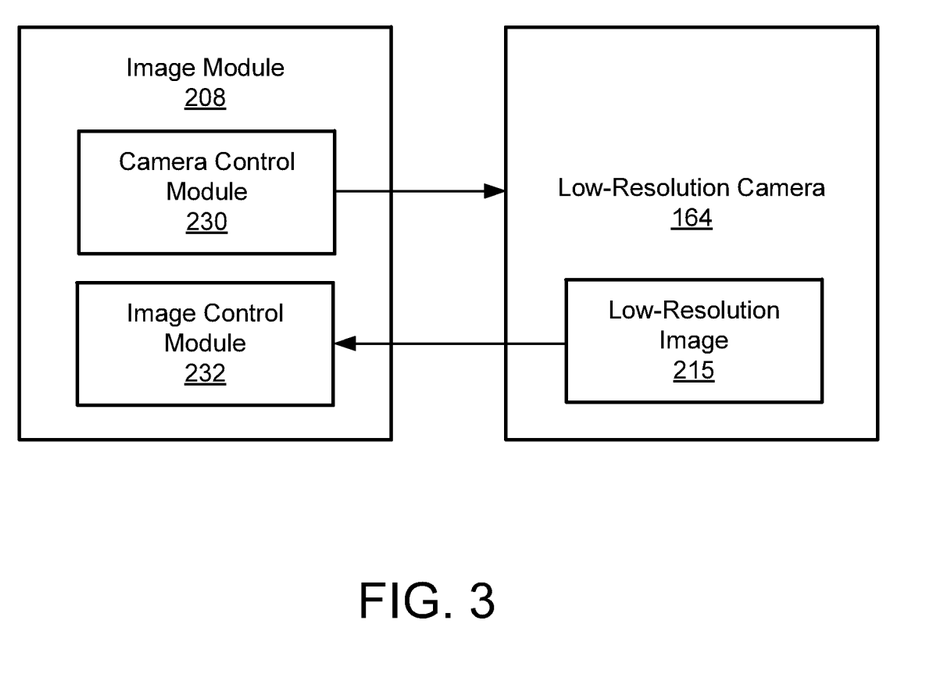
FIG. 3 is a schematic block diagram illustrating communication between an image module of a controller and a low-resolution camera of a mobile apparatus according to one embodiment.

In some implementations, the image module 208 generates an image capture command that is wirelessly communicated to the second transceiver 202B of the mobile apparatus 110 via the first transceiver 202A of the controller 120. Referring to FIG. 3, the image module 208 may include a camera control module 230 that generates the image capture command. Generally, the image capture command commands the low-resolution camera 164 to capture a low-resolution image 215. In some implementations, the image capture command commands the low-resolution camera 164 to capture multiple low-resolution images 215 at a designated frequency. The frequency may be based on the speed at which the mobile apparatus 110 is moving along the designated path 236, the designated area of the pest-inhabited object 130 being covered by the designated path 236, and the resolution of the low-resolution camera 164. For example, the designated frequency of the capture of images by the low-resolution camera 164 may increase based on an increase in the speed of the mobile apparatus 110, a decrease in the designated area to be covered, or a decrease in the resolution of the low-resolution camera. In contrast, the designated frequency of the capture of images by the low-resolution camera 164 may decreased based on a decrease in the speed of the mobile apparatus 110, an increase in the designated area to be covered, or an increase in the resolution of the low-resolution camera. After receiving the data communication signal from the image module 208, the data communication signal including one or more motion control commands, the low-resolution camera 164 captures low-resolution images 215 in the commanded manner.

Referring again to FIG. 3, the image module 208 also includes an image control module 232 that receives low-resolution images 215 from the low-resolution camera 164. The low-resolution images 215 are wirelessly transmitted from the mobile apparatus 110 to the image control module 232 via the second transceiver 202B of the mobile apparatus 110 and the first transceiver 202A of the controller 120. Generally, the image control module 232 aggregates or compiles the low-resolution images 215 received from the low-resolution camera 164 into a composite image 212. The image control module 232 aggregates the low-resolution images 215 by spatially positioning the images directly adjacent each other according to the spatial positioning of the portions of the pest-inhabited object 130 captured by the images. In this manner, the composite image 212 includes a plurality of low-resolution images 215, each capturing only a portion of the designated area of the pest-inhabited object 130, arranged to show an entirety of the designated area of the pest-inhabited object 130. In the illustrated implementation, the composite image 212 includes multiple rows each with a plurality of low-resolution images 215 and multiple columns each with a plurality of low-resolution images. In other implementations, the composite image 212 can be a circular image that includes multiple rings each with a plurality of low-resolution images.

Because the low-resolution images 215 are aggregated into a composite image 212 with a necessarily higher resolution, the resolution of each image can be lower, which allows the low-resolution camera 164 to be smaller, less complex, and lighter. To aid in the spatial positioning of the low-resolution images 215, of the composite image 212, relative to each other, each low-resolution image may be tagged with the position of the mobile apparatus 110 when the respective low-resolution image was captured by the low-resolution camera 164. The position of the mobile apparatus 110 may be provided by the position module 216 of the controller 120 as will be described in more detail below.

In addition to capturing a plurality of low-resolution images 215 of the pest-infected object 130, the system 100 may also perform the secondary operation or objective of locating a pest 132 on the object 130 and deploying the weapon 166 to at least agitate the located pest. The target module 214 of the image module 208 locates a pest 132 on the pest-inhabited object 130 based on the location of an identified pest in the composite image 212 and generates a pest location 234 of the pest. The pest location 234 indicates the location of the pest 132 on the pest-inhabited object 130. Referring to FIG. 4, in some implementations, the target module 214 includes an identification module 240 and a location module 242.

The identification module 240 is configured to identify the presence of an abnormality, e.g. pest 132, in the composite image 212. According to an implementation, the identification module 240 scans the composite image 212 (e.g., successively scans the low-resolution images 215 of the composite image) for unexpected or abnormal characteristics in the composite image 212. The unexpected characteristics can include one or more of unexpected colors, shapes, contrasts, brightness, patterns, etc. The identification module 240 identifies unexpected characteristics as a pest 132. The identification module 240 may store expected characteristics of the composite image 212, which can be predetermined or known characteristics of the pest-inhabited object 130 provided by a user. Based on one or more considerations, such as the type of pest-inhabited object 130, the season, the climate, soil conditions, sunlight conditions, terrain, and the like, certain characteristics of the pest-inhabited object 130 can be expected. For example, a pest-inhabited object 130 of a particular type, during a particular season, and receiving a certain amount of sunlight may be expected to have foliage of a certain color, thickness, and pattern. Additionally, the identification module 240 may store unexpected characteristics, such as a color, size, shape, etc. of a pest known to be infesting the pest-inhabited object 130, to ensure the unexpected characteristic found by the identification module 240 is indeed a pest 132.

After the identification module 240 identifies an abnormality, such as the pest 132, in the composite image 212, the location module 242 determines the location of the abnormality of an object, e.g., the location of the pest 132 on the pest-inhabited object 130, based on the identification of the abnormality in the composite image 212. In the illustrated embodiment, because the low-resolution images 215 of the composite image 212 are tied to actual locations on the pest-inhabited object 130, the location of the identified pest 132 in the composite image 212 corresponds with the location of the pest on the pest-inhabited object. In one implementation, each low-resolution image 215 of the composite image 212 is tagged with the position of the mobile apparatus 110 when the respective image was taken, which corresponds with a location on the pest-inhabited object 130. Accordingly, the location module 242 associates the location of the pest 132 on the pest-inhabited object 130 with the position of the mobile apparatus 110 tagging the low-resolution image 215 displaying the unexpected characteristic(s), or the average position of the mobile apparatus 110 tagging the low-resolution images collectively displaying the unexpected characteristic(s). The location module 242 then generates the pest location 234 based on the associated location of the pest 132 on the pest-inhabited object 130.

The motion control module 206 commands the mobile apparatus 110 to move to a weapon-deployment location based on the pest location 234 or location of the abnormality. In one implementation, the weapon-deployment location is the position of the mobile apparatus 110 tagged to the low-resolution image 215 displaying the unexpected characteristic(s), or the average position of the mobile apparatus 110 tagged to the low-resolution images collectively displaying the unexpected characteristic(s). After the position module 216 confirms the mobile apparatus 110 is in the weapon-deployment location, the objective control module 235 generates a deployment command that is wirelessly communicated to the second transceiver 202B of the mobile apparatus 110 via the first transceiver 202A of the controller 120. Generally, the deployment command commands the objective device 165 to deploy. In the illustrated embodiment, the deployment command is a weapon-deployment command that commands the weapon 166 to deploy. Accordingly, after receiving the weapon-deployment command from the objective control module 235, the weapon 166 deploys to at least agitate the pest 132. In certain implementations, deployment of the weapon 166 includes penetrating the pest 132 with a needle-like instrument 174 and injecting the pest with poison from a poison source 178 on-board the mobile apparatus 110 through the needle-like instrument. In contrast, in some implementations, deployment of the weapon 166 includes spraying poison from a poison source 178 on-board the mobile apparatus 110 onto the pest 132. In other implementations, deployment of the weapon 166 includes penetrating the pest 132 with a sharp instrument 174 to hurt or kill the pest. Alternatively, deployment of the weapon 166 includes hitting the pest 132 with a blunt instrument 174 to agitate, hurt, or kill the pest.

The health module 210 of the communication module 204 is configured to assess a health status of the mobile apparatus 110. The health module 210 receives health status updates via data communication signals wirelessly transmitted from the mobile apparatus 110 via the first and second transceivers 202A, 202B, respectively. In one implementation, the mobile apparatus 110 includes a health module 222 that collects health status information from one or more components of the mobile apparatus 110. For example, the health module 222 may receive a quantity of poison left in the poison source 178, or alternatively include a sensor for detecting the quantity of poison left in the poison source. In other examples, the health module 222 may receive a status of the objective device 165 generally, propulsion device 162, low-resolution camera 164, and/or position communication device 170. The health module 222 is configured to communicate health status information regarding the mobile apparatus 110 to the health module 210 of the controller 120. In some implementations, the mobile apparatus 110 does not includes a health module 222, and each component is configured to individually report health status information directly to the health module 210 of the controller 120. For example, in such implementations, the weapon 166 may detect and report the quantity of poison left in the poison source 178 directly to the health module 210 via the first and second transceivers 202A, 202B. The quantity of poison left in the poison source 178 may be detected directly by a sensor, or indirectly by comparing a known starting quantity of poison in the poison source 178 with the quantity of poison that has been injected into or sprayed onto pests 132

The position module 216 is configured to determine a position (e.g., in 3-dimensional space) of the mobile apparatus 110 based on signals received from the mobile apparatus 110. In one implementation, the position module 216 includes a sensor array 218. The sensor array 218 may include a plurality of spaced-apart sensors or receivers that receive signals from the mobile apparatus 110. Generally, based at least partially on the distance between the spaced-apart sensors of the sensor array 218 and the relative characteristics, such as magnitude, intensity, frequency, time delay, of the signals received at the sensors, the position module 216 determines the position of the mobile apparatus 110. For example, knowing the distance between the sensors of the sensor array 218, a variance in the intensity of a light signal generated by the mobile apparatus 110 detected by the sensors may indicate the relative or absolute position of the mobile apparatus. Alternatively, in another example, knowing the distance between the sensors of the sensor array 218, a variance in the timing of receipt of a signal generated by or reflected off of the mobile apparatus 110 at the sensors of the sensor array also may indicate the relative or absolute position of the mobile apparatus. The position of the mobile apparatus 110 determined by the position module 216 is communicated to the communication module 204 for processing as described above. The sensors of the sensor array 218 may be spaced-apart about the controller 120 in some implementations. Alternatively, each sensor of the sensor array 218 may form part of a separate structure where the structures containing the sensors are spaced apart from each other.

The signals from the mobile apparatus 110, and received by the sensor array 218 of the position module 216 as described above, may be generated at the mobile apparatus 110. For example, the position communication device 170 of the mobile apparatus 110 may be configured to generate and transmit signals that are received by the sensor array 218. In an implementation, the position communication device 170 is a light emitter (e.g., laser) that generates and emits light signals. The sensors of the sensor array 218 may be light-intensity sensors that detect the intensity of the light signals. According to another implementation, the position communication device 170 is an electromagnetic signal emitter that generates and emits electromagnetic signals. The sensors of the sensor array 218 may be sensors or antennas, and associated circuitry, that detect the characteristics of the electromagnetic signals.

Alternatively, the signals from the mobile apparatus 110, and received by the sensor array 218 of the position module 216, may be generated at the controller 120 and reflected off of the mobile apparatus 110. For example, the position module 216 may include or control a signal emitter that generates and emits a signal toward the mobile apparatus 110. The signal reflects off the mobile apparatus 110 and is subsequently sensed by the sensors of the sensor array 218. In one implementation, the signal emitter is a laser that generates a laser beam, and the position communication device 170 is a reflective surface of the mobile apparatus 110.

The system 100 is configured, in some implementations, to minimize the size of and number of components on the mobile apparatus 110. Accordingly, as described above, many of the components and sub-systems that could be on the mobile apparatus, such as a power source (e.g., battery), image analyzer, target locator, and objective controller, are offloaded to a remote controller. In fact, in some implementations, the mobile apparatus consists only of a body, low-resolution camera, propulsion device, and at least one transceiver. In certain implementations, the mobile apparatus consists only of a body, low-resolution camera, propulsion device, at least one transceiver, and an objective device 165.

Although the system 100 has been described above as being associated with a particular embodiment for controlling pests, it is recognized that in other embodiments the system can be used for different applications. For example, as mentioned above, in some embodiments, the system 100 captures images of the target 133 associated with the object 131. The object 131 can be any of various objects, such as man-made structures and natural structures. In some implementations, the object 131 is a structure that is difficult for humans to approach or enter, and difficult to approach or enter using large-scale unmanned devices. According to one example, the object 131 may be the site of a nuclear plant disaster where high levels of nuclear radiation make it difficult or impossible for humans to inspect the site in person. Additionally, some locations of the site may be inaccessible for inspection by large-scale unmanned devices, such as robots. As an example, an interior target 133 of the object 131 may only be accessible through a small opening 135 or access point in the object.

The target 133 can be any of various known or unknown portions of the object 131. For example, the target 133 may be a known component in a known location of the object 131 where a visual inspection of the known component is desired. Alternatively, or additionally, like the location of a pest 132 on the pest-inhabited object 130, the target 133 of the object 131 may be unknown. For example, the target 133 may be previously unknown damage to or abnormalities in the object 131 in a generalized portion of the object targeted by the system 100.

In view of the above-described features and operations of the mobile apparatus 110, the mobile apparatus can be employed to inspect targets 133 of objects 131 where the target and/or object is inaccessible by humans or large-scale unmanned devices. More specifically, the movement of the mobile apparatus 110 can be controlled by the controller 120 as described above to access the target 133 of the object 131 and capture a plurality of low-resolution images 215 of the target 133. More specifically, the mobile apparatus 110 may be controlled to move along a designated path 236 determined by the path module 207. The designated path 236, including the location and shape of the path, is determined based on a desired portion of the object 131 to be scanned for targets 133, and the resolution of the low-resolution camera 164.

Additionally, in some implementations, the mobile apparatus 110 can be equipped to perform a secondary objective or operation in addition to capturing a plurality of low-resolution images 215 of the target 133. The secondary operation of the mobile apparatus 110 may include identifying and locating a target 133, repairing the target, and/or sampling the target or a space proximate the target. Identifying and locating the target 133 can be executed by the target module 214 based on a composite image 212 of the object 131 generated by the image module 208 as described above, except the target being identified is an abnormality other than a pest. After a target 133 has been identified and located, the system 100, in some implementations, includes features for repairing the target 133. For example, instead of, or in addition to, a weapon 166, the objective device 165 of the mobile apparatus 110 may include a repair tool that is deployed via command from a repair tool control module of the controller 120 to repair the target 133. The repair tool may be any of various tools, such as material applicators, weldment devices, scissors, fastening tools, button/switch actuator, etc., or include any of various materials, such as bonding materials, chemical agents, etc. Additionally, or alternatively, whether or not a target has been identified and location, in certain implementations, instead of a weapon 166, the objective device 165 of the mobile apparatus 110 may include a composition sensor to detect a composition of the object 131 and/or a space proximate (e.g. within) the object. Raw data regarding detected compositions collected by the composition sensor can be wirelessly transmitted back to the controller 120 for analysis.

Although the system 100 and mobile apparatus 110 of FIG. 1 are illustrated as a flight-based system and mobile apparatus, the same principles of the system and mobile apparatus described above apply to ground-based or water-based applications. For example, rather than a mobile apparatus 110 configured for aerial flight to control pests above the ground, in some implementations, the mobile apparatus 110 is a ground or water unmanned vehicle configured to move on or under the ground, or on or under water, to control pests on/in the ground or on/in the water, respectively.

Figure 5:
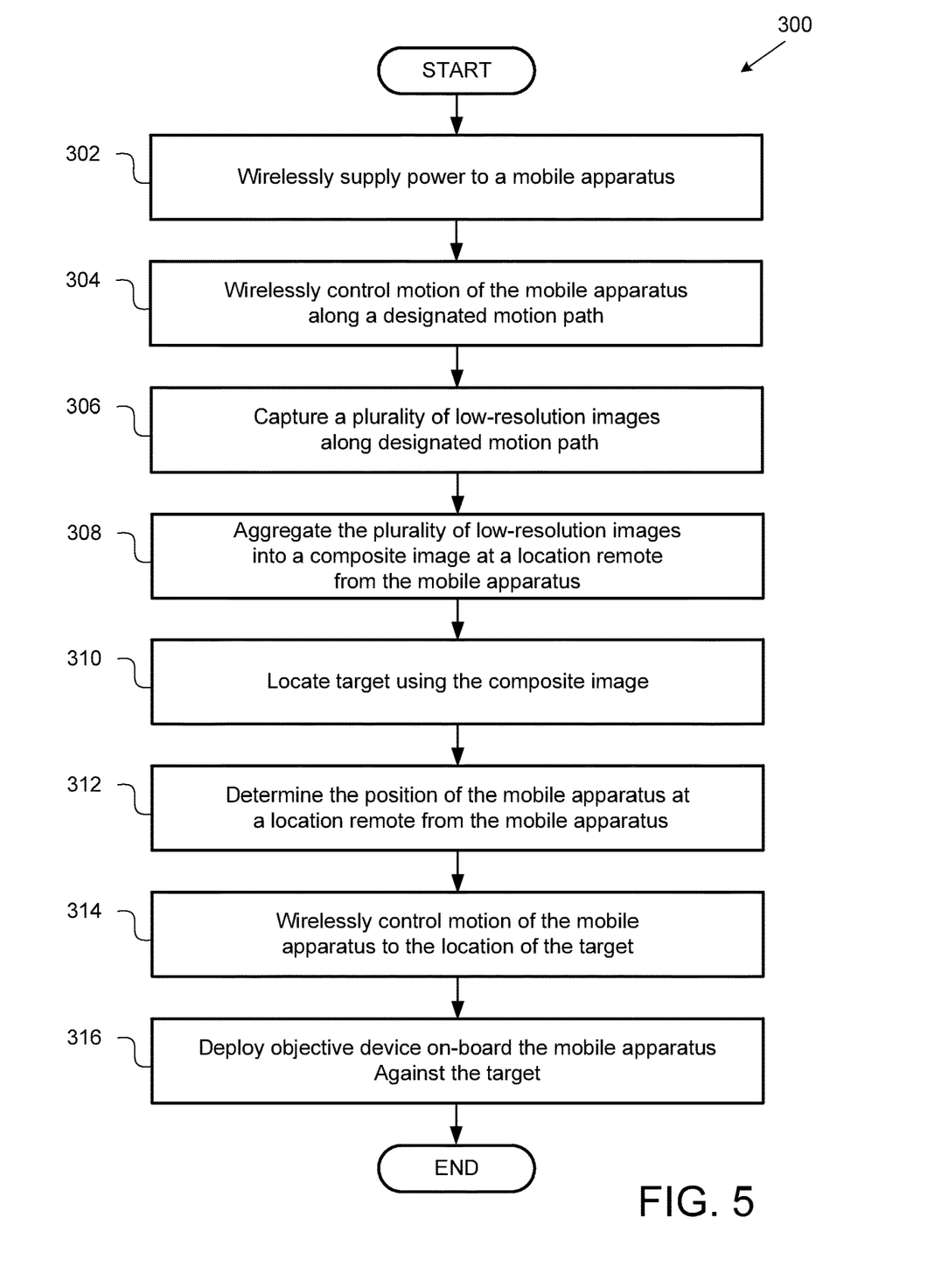
FIG. 5 is a schematic flow diagram of a method for controlling pests according to one embodiment.

Referring to FIG. 7, according to one embodiment, a method 300 for capturing images of an object includes moving a mobile apparatus along a path adjacent (e.g., proximate, next to, near, within, or above) the object. Moving the mobile apparatus may include wirelessly controlling motion of the mobile apparatus along a designated path at 304. The method 300 may also include wirelessly supplying power to the mobile apparatus at 302 in order to provide the energy for the mobile apparatus to propel or move itself. Furthermore, the method 300 includes capturing low-resolution images, such as single-pixel images, along the designated path at 306, and aggregating the plurality of low-resolution images into a composite image at a location remote from the mobile apparatus at 308. The location remote from the mobile apparatus can be a controller located on the ground. The method 300 additionally includes locating a target on the object using the composite image at 310. Also, the method 300 includes determining the position of the mobile apparatus at a location remote from the mobile apparatus, such as a controller located on the ground, at 312. The method 300 further includes wirelessly controlling the motion of the mobile apparatus to move to the location of the target at 314. In some implementations, the location can be a weapon-deployment location, and the method 300 may further include deploying a weapon on-board the mobile apparatus to at least agitate the pest at 316 with the mobile apparatus in the weapon-deployment location. Alternatively, the location can be a repair or sampling location proximate the target, and the method 300 may further include deploying a repair tool or composition sensor on-board the mobile apparatus to repair or sample the target with the mobile apparatus in the repair or sampling location, respectively. Power for operation of the mobile apparatus can be wirelessly supplied to the mobile apparatus at 302.

The method 300 may further include a target operation confirmation sub-process to confirm whether a secondary operation associated with the target was successful. For example, the target operation confirmation sub-process can be a pest removal confirmation sub-process in some implementations. Such a pest removal confirmation sub-process may include, after deploying the weapon, moving the mobile apparatus along a second path adjacent the pest-inhabited object, capturing second low-resolution images of the pest-inhabited object along the second path, aggregating the second low-resolution images into a second composite image at the location remote from the mobile apparatus. The second path may be the same shape as, and in the same location as, the initial path followed in step 304. The pest removal confirmation sub-process may further include comparing the composite image from step 308 with the second composite image, and determining a status (e.g. absence or presence) of the pest based on the comparison between the composite image and the second composite image. Similarly, in certain implementations, the target operation confirmation sub-process can be a repair confirmation sub-process. Such a repair confirmation sub-process may be similar to the pest removal confirmation sub-process, except the repair confirmation sub-process includes comparing the composite image from step 308 with the second composite image, and determining whether the repair was successful based on the comparison between the composite image and the second composite image.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element. In the drawings, elements and/or components, if any, represented with dashed lines, indicate alternative or optional examples of the present disclosure.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As will be appreciated by one skilled in the art, aspects of the present invention can be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing.

In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions, etc.

Aspects of the embodiments may be described above with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A system for capturing images, comprising:
   a mobile apparatus movable along a path proximate an object in an autonomous primary operation state and configured to engage a target on the object with a weapon of the mobile apparatus in an autonomous secondary operation state, the mobile apparatus comprising:
      a low-resolution camera having a single-pixel resolution to capture a plurality of low-resolution images of the object along the path in the autonomous primary operation state, each of the low-resolution images comprising a single pixel image, the path having a shape comprising a plurality of waves, the waves having a spatial frequency indirectly proportional to a pixel count of each of the low-resolution images; and
      a second transceiver to wirelessly transmit the plurality of low-resolution images; and
   a controller proximate the object and physically separate from the mobile apparatus, the controller comprising:
      a first transceiver to wirelessly receive the plurality of low-resolution images from the second transceiver; and
      an image module to aggregate the plurality of low-resolution images into a composite image.

2. The system of claim 1, wherein:
   the controller further comprises a motion control module to generate motion control commands;

the first transceiver wirelessly transmits the motion control commands;
the second transceiver wirelessly receives the motion control commands from the first transceiver; and
the mobile apparatus further comprises a propulsion device to provide lift and directional flight for the mobile apparatus in response to the motion control commands.

3. The system of claim 1, wherein:
the controller further comprises a power transmitter to wirelessly transmit electrical power to the mobile apparatus; and
the mobile apparatus further comprises a power receiver to wirelessly receive electrical power from the controller.

4. The system of claim 1, wherein:
the mobile apparatus comprises a position communication device to transmit signals; and
the controller comprises a position module to determine a position of the mobile apparatus based on the signals transmitted from the position communication device.

5. The system of claim 4, wherein:
the position communication device comprises a light emitter;
the position module comprises a sensor array that detects light emitted from the light emitter; and
the position module determines the position of the mobile apparatus based on light detected by the sensor array.

6. The system of claim 1, wherein:
the composite image comprises a plurality of columns and a plurality of rows each comprising a plurality of low-resolution images of the object; and
each wave of the shape of the path corresponds with two adjacent columns of the plurality of columns of the composite image or two adjacent rows of the plurality of rows of the composite image.

7. The system of claim 6, wherein the spatial frequency of the plurality of waves of the path is further based on at least one of mobile apparatus speed and size of the area captured in each low-resolution image of the plurality of low-resolution images.

8. The system of claim 1, wherein:
the path comprises a plurality of passes along a portion of the object;
the composite image is of the portion of the object; and
the quantity of passes of the plurality of passes of the path is dependent on a pixel count of the low-resolution camera.

9. The system of claim 1, wherein:
the mobile apparatus further comprises a first health module to generate health status data;
the second transceiver wirelessly transmits the health status data;
the first transceiver wirelessly receives the health status data from the second transceiver; and
the controller comprises a second health module to receive and analyze the health status data received wirelessly from the mobile apparatus.

10. The system of claim 1, wherein:
the mobile apparatus comprises an unmanned aerial vehicle;
the path is a flight path above a ground level; and
the controller is located on the ground level.

11. The system of claim 1, wherein:
the object is a pest-inhabited object;
the weapon is deployable against a pest on the pest-inhabited object in the autonomous secondary operation state;
the image module locates a pest on the pest-inhabited object using the composite image;
the controller further comprises a motion control module to control movement of the mobile apparatus into a weapon-deployment location via motion control commands wirelessly transmitted from the first transceiver and wirelessly received by the second transceiver, the weapon-deployment location being based on the location of the pest; and
the controller further comprises a weapon control module to control deployment of the weapon via weapon deployment commands wirelessly transmitted from the first transceiver and wirelessly received by the weapon via the second transceiver.

12. The system of claim 1, wherein the mobile apparatus further comprises:
a body; and
a propulsion device coupled to the body and actuatable to propel the body in response to a motion control command.

13. The system of claim 12, wherein the motion control command is transmitted from the controller to the mobile apparatus.

14. The system of claim 12, wherein the second transceiver is configured to:
wirelessly receive the motion control command in the autonomous primary operation state;
wirelessly receive a second motion control command defining a pre-programmed flight path to transition the mobile apparatus to the autonomous secondary operation state and control movement of the mobile apparatus into a weapon-deployment location determined from analysis of the plurality of low-resolution images by the controller; and
wirelessly receive an actuation command to autonomously control deployment of the weapon against the pest.

15. The system of claim 12, wherein:
the object is a pest-inhabited object;
the weapon is deployable against a pest on the pest-inhabited object in the autonomous secondary operation state;
the mobile apparatus is micro-sized to be between approximately 50% and 200% of a size of the pest; and
the propulsion device is configured to provide lift and directional flight for the body.

16. The system of claim 12, wherein:
the mobile apparatus further comprises an electrical power receiver coupled to the body; and
the electrical power receiver is configured to wirelessly receive electrical power for powering the propulsion device and low-resolution camera.

17. The system of claim 1, wherein the weapon comprises at least one of a blunt-force weapon or a cutting weapon.

18. The system of claim 1, wherein the weapon comprises a repellent-based weapon.

19. The system of claim 11, wherein the weapon comprises a poison-based weapon.

20. The system of claim 19, wherein:
the weapon comprises a poison source; and
the weapon comprises a conduit for fluidly communicating poison from the poison source to the poison-based weapon.

* * * * *